United States Patent [19]

Presby

[11] 4,307,296
[45] Dec. 22, 1981

[54] METHOD OF OBSERVING THE CORE REGION OF OPTICAL FIBERS AND PREFORMS

[75] Inventor: Herman M. Presby, Highland Park, N.J.

[73] Assignee: Bell Telephone Laboratories, Incorporated, Murray Hill, N.J.

[21] Appl. No.: 140,313

[22] Filed: Apr. 14, 1980

[51] Int. Cl.³ ............................................. G01N 21/64
[52] U.S. Cl. .................................. 250/459; 250/461 R
[58] Field of Search .................... 250/458, 459, 461 R; 350/96.29, 96.3, 96.31

[56] References Cited
U.S. PATENT DOCUMENTS 3,879,128  4/1975  Presby ........................... 250/571 X
4,161,656  7/1979  Marcuse et al. .................. 250/459

Primary Examiner—Davis L. Willis
Attorney, Agent, or Firm—Sylvan Sherman

[57] ABSTRACT

A method of observing the core region of optical fibers and fiber preforms is disclosed comprising the step of inducing fluorescence in at least one of the index-modifying dopants present in the core being observed by illuminating said fiber/preform with radiation at the peak absorption wavelength for said dopant, and observing the region between the fluorescing edges of said fiber/preform. The core diameter can be determined by measuring the distance between said edges. This technique can be utilized to control the fiber pulling rate during fabrication.

5 Claims, 6 Drawing Figures

METHOD OF OBSERVING THE CORE REGION OF OPTICAL FIBERS AND PREFORMS

TECHNICAL FIELD

This invention relates to a method for observing the core region of optical fibers and optical fiber preforms.

BACKGROUND OF THE INVENTION

The diameter of the core, and the refractive index profile of the core and cladding are the basic parameters that specify the transmission characteristics of an optical fiber. Thus, it is very important that these parameters be carefully controlled as the fiber is made. This may involve maintaining them as uniform as possible or, alternatively, may include certain predefined variations. Accordingly, a simple nondestructive technique for accurately observing these parameters is extremely useful. One such technique, which involves measuring the backscattered radiation pattern obtained when the fiber is illuminated by a cw laser beam is described in U.S. Pat. No. 3,879,128. In U.S. Pat. No. 4,161,656, a method of measuring the index profile of optical fibers and fiber preforms using uv illumination is described. More recently, techniques for measuring and controlling the index profile of fiber preforms during fabrication are disclosed in copending application Ser. No. 124,923, filed Feb. 26, 1980, and assigned to applicant's assignee. None of these, however, provide a simple and quick technique for observing the core region of optical fibers and preforms either during or after fabrication.

SUMMARY OF THE INVENTION

The core region of a fiber/preform is typically distinguished from the surrounding cladding by the presence of one or more index modifying dopants. The present invention provides an extremely sensitive method of accurately locating the dopant molecules by illuminating the fiber/preform with ultra-violet radiation at the wavelength of the absorption peak for one of the particular dopants present. This causes the latter to fluoresce strongly, thereby providing a clear indication of the spatial distribution of the particular dopant. Accordingly, the method of observing the core region of an optical fiber or fiber preform, in accordance with the present invention, includes the steps of: inducing fluorescence in at least one of the index-modifying dopants present in the core being measured by illuminating said fiber/preform with radiation whose wavelength corresponds to the peak absorption wavelength of said dopant; and observing the region between the fluorescing edges within said fiber/preform. If more than one dopant is present, an observation is made for each of the dopants in order to determine the full dimensional extent of the core region.

To obtain an actual measurement of the core diameter, the distance between the observed fluorescing edges is measured and then corrected, as explained hereinbelow, to take into account the refraction at the cladding-air interface. Alternatively, the diameter measurement can be made with the fiber/preform immersed in an index-matching medium, in which case no correction is necessary.

It is an advantage of the invention that observations and measurements can be made quickly, requiring no specialized equipment. On the other hand, very accurate measurements can be made automatically using readily available state of the art equipment. Means can be provided to utilize the results of these measurements to control a fabrication parameter such as, for example, the fiber pulling rate. These and other advantages will be described in greater detail hereinbelow.

DETAILED DESCRIPTION

Figure 1:
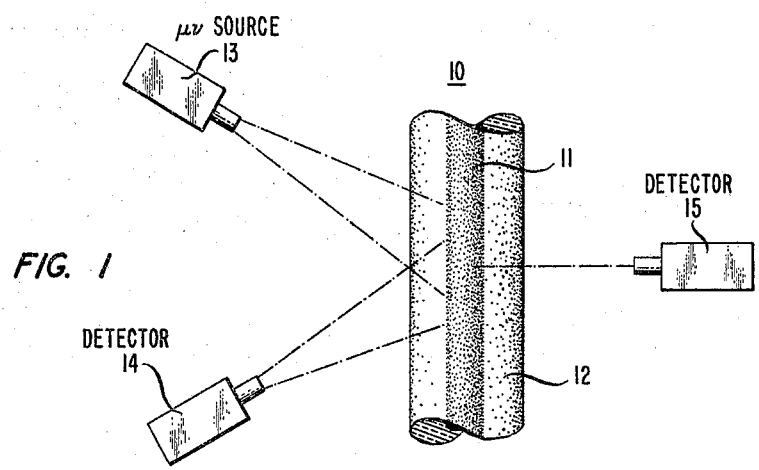
FIG. 1 shows an arrangement for measuring the core diameter of optical fiber/preforms in accordance with the present invention.

Referring to the drawings, FIG. 1 shows a portion of an optical fiber 10 comprising an inner core region 11 surrounded by a cladding 12. FIG. 1 is equally representative of a fiber preform and, insofar as the present invention is concerned, all references to an optical fiber are equally applicable to fiber preforms and, for this reason, the term "fiber/preform" will be used hereinafter where appropriate.

Typically, in a multimode optical fiber, the refractive index of the core region is graded, being a maximum at the center and decreasing to some minimum value at the core-cladding interface. In a single mode fiber the core index tends to be uniform over the entire core region. In either case, the difference between the core index and the cladding index is due to the presence of one or more index modifying dopants such as germanium, boron and phosphorus. By determining the limits of distribution of these dopants, the core region can be identified and its diameter determined. This is done, in accordance with the present invention, by illuminating the section of fiber/preform 10 with ultraviolet radiation (uv) from a suitable source 13. The wavelength of the uv is selected to cause the particular dopant of interest to fluoresce. In particular, the wavelength of the uv corresponds to the peak absorption wavelength for the dopant. For example, if the dopant of interest is germanium, the wavelength of the uv is 2500 Angstroms. At this wavelength, pratically all of the uv is absorbed in the surface region of the core. This, it should be noted, is in contrast to the requirements in U.S. Pat. No. 4,161,656 where a different (i.e., higher) wavelength is used (i.e., 3560 Angstroms) in order to obtain full penetration of the core by the uv. By contrast, when illuminated at the peak absorption wavelength, only the exposed surface of the core fluoresces strongly. The extent of the core region can then be accurately determined by means of a detector 14 located either on the same side as the uv source, or by a detector 15 located on the side of the fiber/preform opposite to that of the source.

Figure 2:
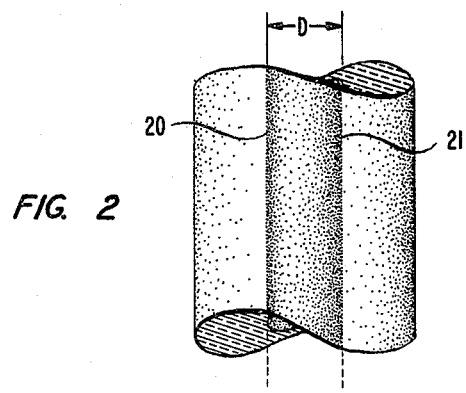
FIG. 2 shows the view of the fluorescing core when the detector is located on the side of the core opposite the uv source.
Figure 3:
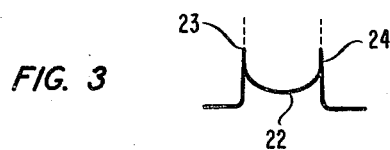
FIG. 3 is a graphic represenation of the intensity of the fluorescence illustrated in FIG. 2.

Detector 14 sees a fully fluorescing core region corresponding to the entire exposed surface. By contrast, detector 15 sees the brightly fluorescing edges 20 and 21, as illustrated in FIG. 2. The region between is less brilliant, consisting of that portion of the fluorescent light produced on the opposite surface that has propagated through the core. This distribution of light intensity is illustrated graphically in FIG. 3 which shows the brilliant edge peaks 23 and 24, and the less brilliant region 22 therebetween. In either case, the edges of the core region are clearly delineated and the distance D between them can be readily measured.

Figure 6:
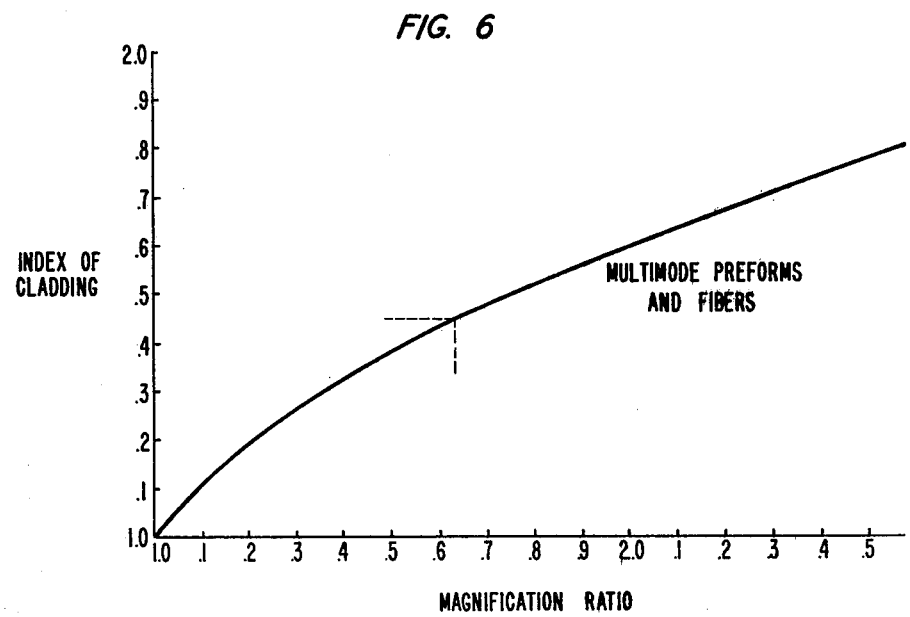
FIG. 6 is a curve relating the magnification factor and the fiber/preform cladding index.

In the case of a single mode fiber/preform, where the core-to-cladding ratio is small, the measured distance D between edges 20 and 21 is also the core diameter. However, for a multimode fiber/preform, where the core-to-cladding ratio is relatively large, the cladding, which behaves as a lens, produces a magnification that is a function of the cladding index. FIG. 6 illustrates graphically the relationship between the magnification ratio and the cladding index for a multimode fiber/preform. Thus, for example, to determine the core diameter for a fiber/preform whose cladding index is 1.45, the measured distance D is divided by the magnification factor of 1.65. Alternatively, the measurement can be made by immersing the fiber/preform in an index-matching medium while making the core measurement, in which case no correction is necessary.

Figure 5:
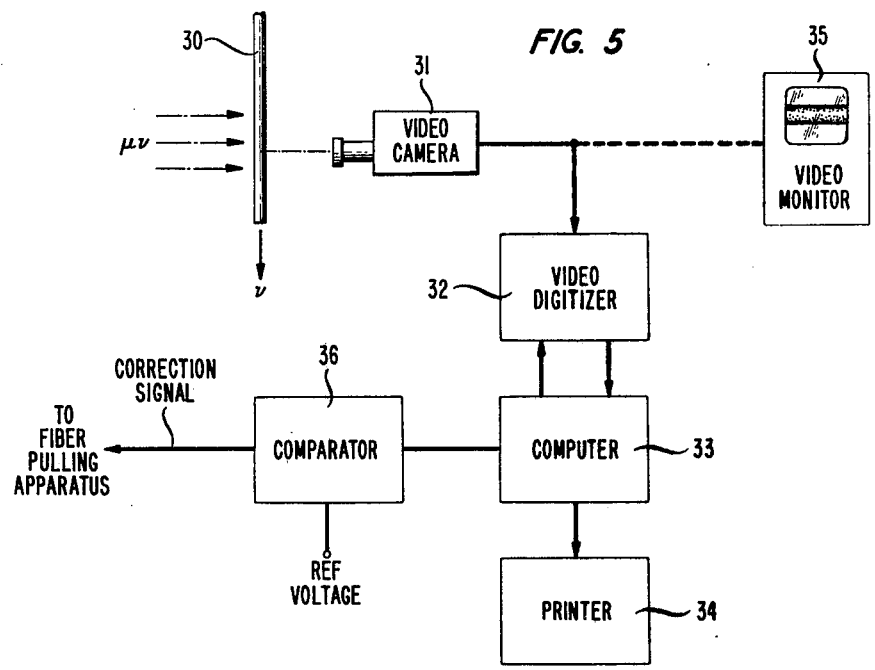
FIG. 5 shows an alternate arrangement for practicing the invention.

FIG. 5 illustrates the manner in which the present invention can be employed to maintain a constant core diameter as a fiber is being pulled from a preform. In FIG. 5, a portion of the pulled fiber 30 is illuminated by uv radiation. A detector, in the form of a video camera 31 located opposite the uv source, views the fluorescing fiber as in the camera's field of view. The output from the camera is optionally coupled to a video monitor 35 for viewing, and to a video digitizer 32 which, under the control of a computer 33, scans the light intensity at any prescribed location along the passing fiber. The information thus obtained is coupled to the computer which generates a signal proportional to the measured diameter. The solution is optionally transmitted to a printer, if a record is desired, and to a comparator 36 which compares the computer signal, which is proportional to the measured core diameter, to a reference voltage, which is proportional to some desired core diameter. The comparator, in turn, generates a correction signal which is transmitted to the fiber pulling apparatus. Thus, for example, if the measured core diameter is too large, the pulling rate is increased. If, on the other hand, it is too small, the pulling rate is decreased.

Figure 4:
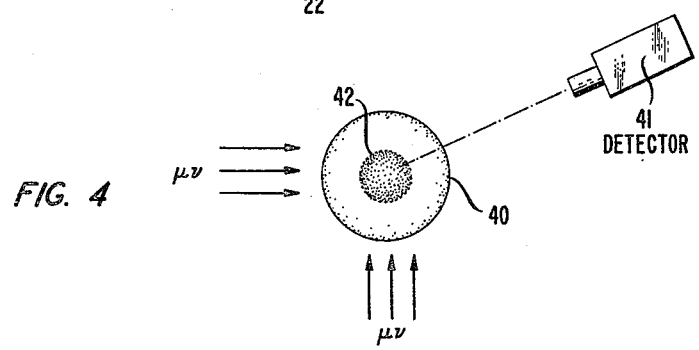
FIG. 4 shows the use of the invention to control the fiber pulling rate.

As indicated hereinabove, when a single uv source is employed, the detector is preferably placed either on the same side of the fiber/preform as the source or directly opposite the source. To ensure good viewing from any location, the fiber is advantageously illuminated from two, mutually perpendicular directions. This arrangement is illustrated in FIG. 4 which shows a fiber 40 in cross-section illuminated from two directions. Detector 41 is arbitrarily located with respect to the sources, yet is in a good position to see the fluorescing edges of the core 42.

I claim:

1. A method of outlining the core region of optical fibers and fiber preforms comprising the step of:
    inducing fluorescence in at least one of the index-modifying dopants present in the core (11) by illuminating said fiber/preform with radiation at the peak absorption wavelength from said dopant.

2. The method according to claim 1 wherein said dopant is germanium, and said illuminating wavelength is 2500 Angstroms.

3. The method according to claim 1 wherein said illumination is directed at said fiber/preform along two, mutually perpendicular directions.

4. The method according to claim 1 including the further step of determining the diameter of said core.

5. The method of pulling a fiber from a fiber preform including the steps of:
    pulling said fiber from said preform at an adjustable rate;
    illuminating said fiber as it is drawn with radiation at the peak absorption wavelength for at least one of the index-modifying dopant present in the fiber core;
    determining the diameter of the core region of said fiber by measuring the distance between the fluorescing edges of said fiber;
    comparing the measured diameter with a predetermined desired core diameter; and
    adjusting the fiber pulling rate in response to said comparison.

* * * * *